United States Patent [19]

Peterson et al.

[11] 4,248,177
[45] Feb. 3, 1981

[54] ANIMAL WATERER WITH RECIRCULATING WATER SYSTEM

[75] Inventors: Jerry D. Peterson, Conrad; Gerald L. Knief, Grundy Center, both of Iowa

[73] Assignee: Ritchie Industries, Inc., Conrad, Iowa

[21] Appl. No.: 37,451

[22] Filed: May 9, 1979

[51] Int. Cl.³ ......................... A01K 7/02; A01K 7/06
[52] U.S. Cl. ...................................... 119/73; 138/33; 219/301
[58] Field of Search ........................ 119/73, 71, 75; 219/301, 298; 138/32, 33

[56] References Cited

U.S. PATENT DOCUMENTS

| | | | |
|---|---|---|---|
| 3,646,955 | 3/1972 | Olde | 119/75 X |
| 4,078,524 | 3/1978 | Peterson et al. | 119/71 |
| 4,091,261 | 5/1978 | Noland | 119/73 X |

Primary Examiner—Hugh R. Chamblee

Attorney, Agent, or Firm—Trexlers, Wolters, Bushnell & Fosse

[57] ABSTRACT

A recirculating animal waterer is disclosed. In one embodiment, the waterer includes a supply conduit which extends from a remote water source underground at a level below the frost line to a first junction located inside a waterer stand. A first nipple extends from that first junction and terminates outside the stand. A crossover conduit extends from the first junction to a remote second junction, also located inside the waterer stand. A second nipple extends from that second junction to a point outside the stand. A return conduit extends from the second junction back to the first junction. This return conduit includes a heatable section. A heater is mounted adjacent the supply conduit heatable section. If desired, a thermostat can be located adjacent the second junction to provide intermittent heater operation. In another embodiment, additional nipples extend from the stand, and water conduits provide an endless, recirculating flow of water past each nipple.

22 Claims, 7 Drawing Figures

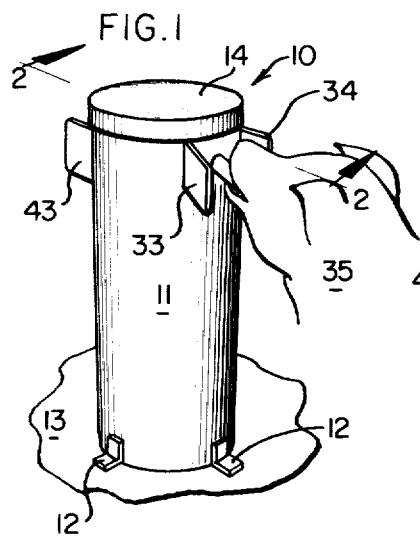
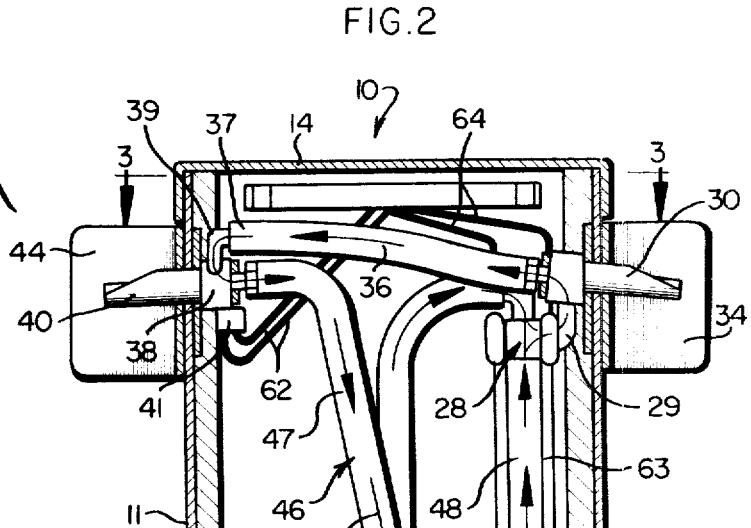
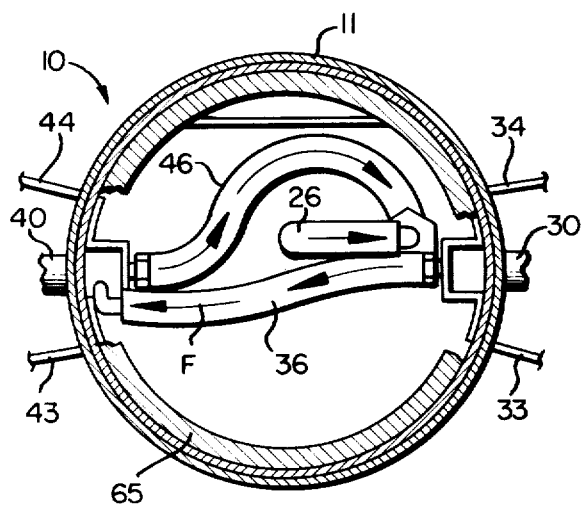
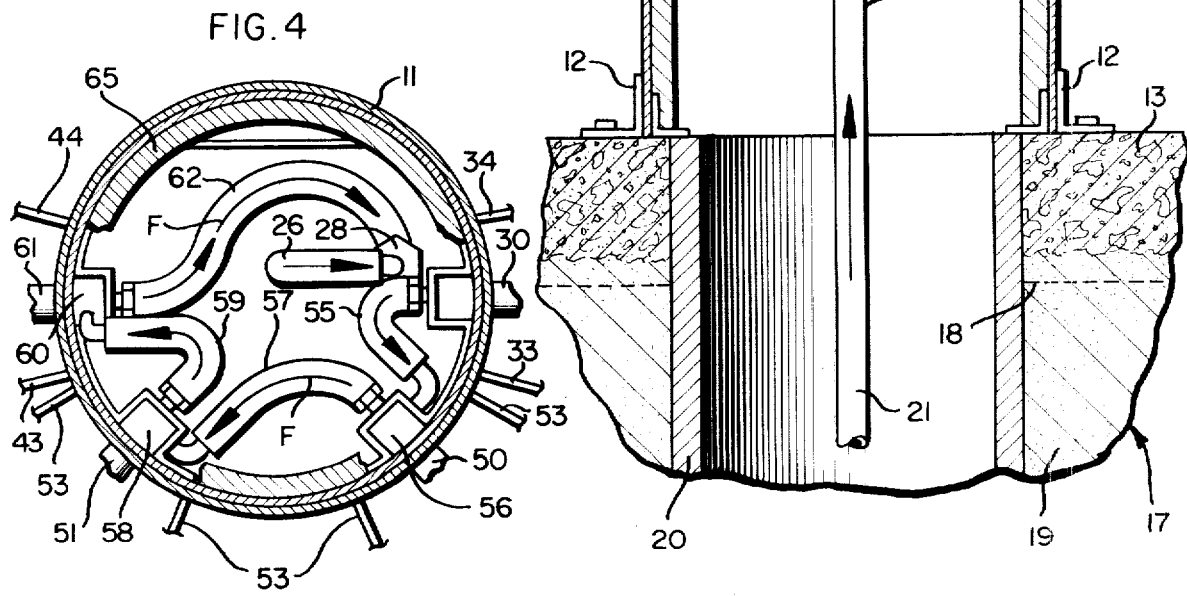

U.S. Patent  Feb. 3, 1981  Sheet 2 of 2  4,248,177
FIG. 5
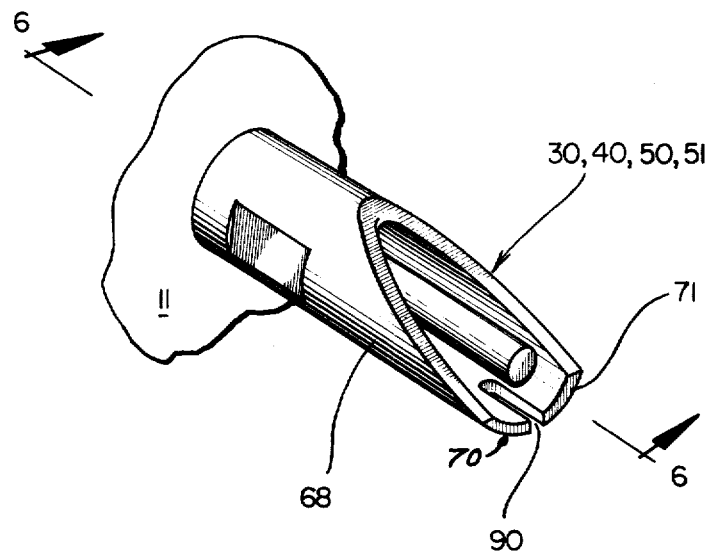
FIG. 7
PRIOR ART
FIG. 6
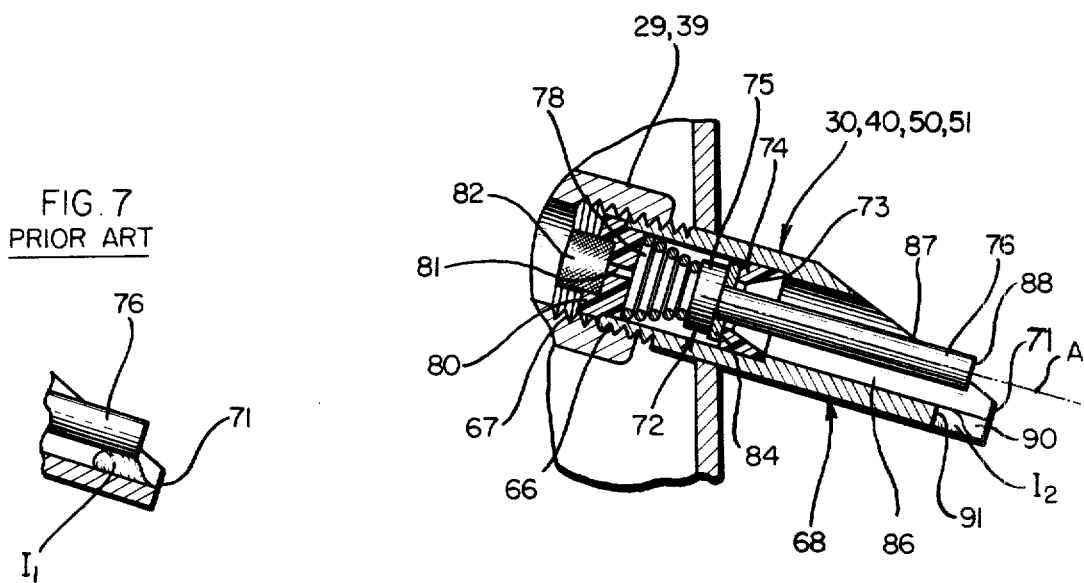

ANIMAL WATERER WITH RECIRCULATING WATER SYSTEM

DESCRIPTION OF THE INVENTION

This invention relates generally to animal waterers, and more particularly concerns a recirculating waterer which will not freeze during very cold weather, yet which will deliver unlimited quantities of water at relatively uniform temperatures to thirsty animals.

An adequate, convenient supply of water is essential to proper modern animal husbandry operations. Hog and like livestock require a constant supply of clean, fresh water. In areas where temperatures can fall below freezing during parts of the year, special efforts must be made to avoid the ill effects of water supply freeze-up if the animals are to prosper.

Modern livestock watering systems often include a network of pipes leading to upstanding housings located in animal pens or other containment areas. Water delivery nipples, located for easy access by the livestock, extend from these housings. Devices of this type which have met with great commercial success are described and illustrated, for example, in co-pending application Ser. No. 750,834 filed Dec. 15, 1976; in co-pending application Ser. No. 910,071 filed May 26, 1978; and in U.S. Pat. Nos. 4,078,524 and 4,110,603. A number of other watering systems and housings have also been offered in more or less direct competition with these waterers.

In at least some such devices, heaters have been provided to prevent water in the pipes located within the housings or stands from freezing. But experience with at least some of the competitive devices has shown that care must be taken in the placement and operation of these heaters to avoid the production of "hot slugs". These "hot slugs" can be produced if water is drawn from the waterers infrequently. Under some circumstances, it might be possible for that water in the pipes located immediately adjacent the heaters to be warmed extensively. If this hot water would then be delivered to the nipples, the drinking animals could be startled and even injured when they unexpectedly receive the "hot slug".

Alternate anti-freeze-up devices provide a continuous flow of water through the waterer pipes. In this way, it is hoped to avoid lowering the water temperature to a point which might cause freezing and consequent clogging and damage to the pipes. Yet other devices provide for recirculating water through part or all of the system. Most of these devices require extensive and expensive piping, plumbing and pumps. Relatively large maintenance and installation costs can be incurred by the user.

It is consequently the general object of the present invention to provide an animal water delivery system which will not freeze even during very cold weather, and which will not develop and deliver water hot slugs.

Another object is to provide an animal waterer which is reliable and rugged in operation, yet inexpensive to manufacture and install.

Yet another object is to provide an animal water delivery system which uses relatively little power for heaters.

Still another object is to provide an animal water delivery system which can be easily adapted for use in a wide variety of installations.

Other objects and advantages of the invention will become apparent upon reading the following detailed description and upon reference to the following drawings. Throughout the drawings, like reference numerals refer to like parts.

BRIEF DESCRIPTION OF THE DRAWINGS

FIG. 1 is a perspective view showing an animal waterer embodying the present invention as it appears in use;

FIG. 2 is a sectional view taken substantially in the plane of line 2—2 in FIG. 1;

FIG. 3 is a sectional view taken substantially in the plane of line 3—3 in FIG. 2;

FIG. 4 is a sectional view similar to FIG. 3 but of an alternate embodiment of the invention;

FIG. 5 is a fragmentary perspective view of a nipple;

FIG. 6 is a fragmentary view taken substantially in the plane of line 6—6 in FIG. 5; and FIG. 7 is a fragmentary view showing a nipple waterer not equipped with a terminal portion anti-freeze-up configuration.

While the invention will be described in connection with a preferred embodiment, it will be understood that it is not intended to limit the invention to that embodiment. On the contrary, it is intended to cover all alternatives, modifications and equivalents as may be included within the spirit and scope of the invention as defined by the appended claims.

Turning first to FIGS. 1 and 2, there is shown a recirculating animal waterer 10 embodying the present invention. Here, this waterer 10 includes a walled housing 11 mounted, as by suitable brackets 12, upon a concrete pad 13 or other foundation in a hog pen or in other animal quarters. The housing 11 is topped by a cap 14. It will be understood that the novel arrangement of conduits and associated apparatus described more specifically below can be installed in housings of rectilinear or other non-cylindrical shapes.

A supply conduit 15 leads from a remote water source (not shown) into the interior 16 of the housing 11. To prevent water freezing in this supply conduit, portions 21 of the conduit 15 are buried or otherwise located in the soil 17. Since that part 19 of the soil 17 which is located below the frost line 18 is, throughout even the coldest weather, at a temperature above freezing, the water in the adjacent conduit is also maintained at an above-freezing temperature.

It will be noted that the supply conduit 15 extends, as illustrated particularly in FIG. 2, upwardly through a tile 20 or other suitable jacket into the housing 11. It is a feature of the invention that but a single supply conduit 15 need by provided to extend upwardly into the waterer 10 itself; considerable savings in piping and plumbing installation are thus obtained.

As illustrated particularly in FIG. 2, water moving up the supply conduit 15 flows through a shut-off valve 25 and a supply conduit extension 26 to a first junction member 28. In the embodiment shown here, this first junction member 28 takes the form of a cap having an ell 29 extending to a first waterer nipple 30. To provide easy access to thirsty animals, the nipple 30 extends from the first junction member 28 through the housing wall 11 and terminates outside the housing waterer 10. It is another feature of the invention that water loss and consequent mess can be minimized by providing shields 33 and 34 adjacent this first nipple 30 so as to require any approaching animal 35 to obtain water from a frontal or facing position as illustrated in FIG. 1.

Water which is not dispensed by the first nipple 30 is directed from the first junction member 28 through a cross-over conduit 36 to a remote cross-over conduit end 37. At this remote end 37, a second junction member 38 is located. To minimize impediment to water flow, the junctions 28 and 38 are located at substantially the same hydraulic level, as shown particularly in FIG. 2. That is, the junctions 28 and 38 are vertically positioned to have elevations within several inches of one another. The illustrated second junction member 38, like the first junction member 28, here takes the form of a cap having an ell 39 directly interconnecting the cross-over conduit 36 and the junction member 38. A second nipple member 40 extends from the second junction member 38 to a point outside the waterer 10 itself. Again, shields 43 and 44 are provided to encourage any approaching animal to orient itself so as to minimize water spillage and consequent waste.

Again, in accordance with the invention, water not dispensed by this second nipple 40 moves past the nipple 40 in an endless flow. To this end, a return conduit 46 extends from the second junction member 38 back to the first junction 28. The conduit includes a first portion 47 which may be formed of flexible tubing, and a vertically mounted second or heatable section 48 which may be formed of metal pipe. The sections 47 and 48 are here joined by a suitable coupling 49. As will be understood from following portions of the explanation, it is important that inlet portions of the heatable section 48 (here, hose portions adjacent the coupling 49) be located below the outlet portions of the section (here, those portions adjacent the junction 28).

It will be understood that the waterer 10 can be provided with more than two nipples by providing appropriate conduit connections in the waterer interior. In accordance with the general aspects of the invention, these connections will provide a supply of water to each nipple, and will permit water to circulate to and past those additional nipples from the force of the convective activity generated, as described below. As shown in FIG. 4, additional nipples 50 and 51 can be extended through the waterer housing 11, and shields 53 can be provided in the manner described above. Flexible or other suitable conduits are provided to cause the carried water to flow in an endless, recirculating path. Here, the water arriving from the supply conduit extension 26 flows through the first junction point 28. Water not dispensed through the first nipple 30 is directed through tube 55 to a junction point 56 associated with a nipple 0. Undispensed water then moves through another tube 57 to another junction point 58 associated with a nipple 51. Again, undispensed water flows through a further tube 59 to a junction point 60 associated with a nipple 61. Excess water then travels along a return conduit 62 similar to the conduit 46 described above. It will be understood that the return conduit 62 will include a heatable section similar to the heatable section 48 at its downstream end.

With any of these nipple and piping arrangements, the described piping or conduit system permits undispensed water to constantly flow in an endless path, as suggested by the arrows F in FIGS. 2, 3 and 4. To positively encourage this flow, a heater member 63, here taking the form of a U-shaped tubular heater device, is mounted in contact with the heatable return conduit section 48. This conduit mounting provides good heat transfer or conduction from the heater to the conduit section 48. When the heater element 63 is electrically energized through connecting wires 64, the water inside the adjacent supply conduit extension 27 is heated. The heated water rises, and consequently begins a motion or flowing action from the heatable section inlet portions upwardly through the heatable section outlet portions and then through the system as suggested by the flow arrows F. Water in the return conduit 46, cooled by adjacent air and lack of exposure to the heater, is encouraged to enter the heatable section 48 through the bottom connection 49. Thus, in accordance with the invention, the heated water constantly flows away from the heater, and the development of hot slugs is prevented.

To minimize heat loss to the atmosphere outside the interior 16 of the waterer stand 10, the space immediately inside but adjacent the waterer stand wall 11 can be insulated with a layer of expanded polystyrene 65. The cap 14, too, can be insulated in this way. When the waterer 10 is so constructed and insulated, it has been found that it is unnecessary to electrically power or operate the heater 63 on a continual basis. Accordingly, a thermostat 41 can be installed in the interior 16 of the housing, and can be connected as by electrical wires 42 to the heater 63 and other portions of the electrical circuit. Advantageously, this thermostat 41 is located adjacent a remotely-mounted nipple (here, the second nipple 40) as illustrated particularly in FIG. 2 so as to energize the heater 63 whenever portions of the second junction member 38, the adjacent nipple 40, and other adjacent portions of the apparatus begin to cool to a temperature below a preset minimum.

In operation, the gentle heating and constant recirculating flow action of the water in the described conduits prevent hot slug development and also prevent water freeze-up at any point. It has been found that the heat provided by the heater 63 and trapped in the housing interior 16 also prevents water from freezing in those portions of the conduits which are located out of the influence of the warm soil 19 below the frost line 18.

Water adjacent and in the in-housing portions of the nipples is also prevented from freezing. Freeze-up in nipple terminal portions outside the housing wall 11 is discouraged by heat conducted from the portions of the nipples which are inside the housing.

Alternatively, or if conditions require, freeze-up in and on nipple terminal portions can be prevented by the design and construction of the nipples themselves. As illustrated particularly in FIGS. 5 and 6, the nipples 30, 40, 50, 51 can be constructed inexpensively, yet are effective in use and provide long service life. The nipple includes a bi-ended body member 68 having an upstream end 66 secured, as by threads 67, to the adjacent ells 29, 39 and water supply junction points. A nipple mouth 70 extends axially toward and terminates at a downstream nipple end 71. An annular shoulder 73 is formed on the valve body interior, and a seat member 74 is carried on the shoulder 73. Through this seat member 74 extends a valve member 72 having a head 75 and an elongated stem 76 extending generally in the direction of the nipple axis. A biasing member—here, a conically-wound coil spring 78—is secured in the body 65 upstream of the valve member head 75. To provide a controlled, metered flow of water through the nipple, a plug member 80 defines a relatively small orifice 81. Bits of foreign matter such as sand and the like are prevented from entering the valve mechanism by a screen member 82 covering the orifice 81. It will be understood that, if desired, a series of plug members 80 can be offered to the nipple installer, each plug member having a relatively different sized orifice 81 so as to provide a relatively different water flow rate through the nipple 30, 40. These plug members 80 can be color-coded to encourage rapid, correct orifice size selection. After selection, the orifice plug and screen are installed on the nipple, and the nipple is then secured to the ell.

A resilient washer-like member 84 can be interposed between the valve member head 75 and the valve seat member 74 so as to provide good water-flow-stopping sealing action and to encourage proper valving action. To permit the livestock 35 (FIG. 1) to actuate the nipple 30, 40, 50, 51 by a biting action, yet prohibit the livestock 35 from grasping the valve member stem 76 and playing with the nipple, the downstream portions 70 of the valve body 65 take the shape of a hollow right cylinder 86, through which a bevel plane has been passed, thereby providing an open side portion 87 of limited extent and partially exposing the valve stem 76 to canting motion by animal biting action. Since the terminal end 88 of the valve stem 76 is located upstream or inwardly of the valve body member downstream end 71, the using livestock are prohibited from grasping the stem 76 during biting action. The plane of the body downstream end extends perpendicularly to the nipple mouth and body axis A and intersects the bevel plane so as to provide an end 71 having an arcuate segmental shape.

Convenient size yet proper operation is provided by providing an internal diameter to the nipple body of about 9/16 inch, an outer diameter to the valve stem of about ¼ inch, and a body bevel plane angle of about 27°.

To encourage the downward, outward flow of water from the nipple 30, 40, the nipple is oriented in a downwardly inclined direction. Preferably, this downward inclination assumes an angle of substantially 15° to the horizontal. The downward inclination of the nipple 30, 40, 50, 51 encourages water flow toward the downstream nipple end 71, thereby encouraging the nipple to be maintained in a clean, dry condition.

The downward nipple inclination can, under certain circumstances, cause the collection of water, saliva from the drinking animal's mouth, and other corruption at or near the downstream nipple end 71. When outside air temperatures are below the freezing level, this water collection can result in the buildup of ice as indicated at $I_1$ in FIG. 7. Under some circumstances, this ice buildup $I_1$ could freeze the nipple in a closed, inactive position and discourage, if not completely prevent, water delivery to thirsty animals.

To prevent this nipple terminal portion freeze-up in carrying out the invention, a slot 90 is formed in the nipple body 45 as shown in FIGS. 5 and 6. Preferably, this slot 90 leads directly from the nipple downstream end 71 axially in an upstream direction past the valve member stem terminal end 88 to a slot end 91. When the slot is so formed, the collection of water and other matter and the consequent creation of ice occurs not at the location designated as $I_1$ in FIG. 7 but, rather, at the location designated as $I_2$ in FIG. 6. It will be noted that the slot is at the midpoint of the end 71, and that consequently this $I_2$ location is at a position in and on the nipple away from the stem 76 so as to prevent nipple freeze-up and improper valve and nipple operation. Further, ice growth at location $I_2$ is inhibited, for it has been found that, as each thirsty animal drinks from the nipple 30, 40, warmth from the animal's mouth will melt any small accretion of ice $I_2$ and other matter in and near the slot, thereby leaving the entire nipple in a relatively freeze-up-free condition.

It will be thus observed that each element of the animal watering apparatus 10 is provided with anti-freeze-up features. Water traveling along the supply conduit 15 will not freeze, due to heat provided from the soil 19 and the housing interior 16. Water in the upper conduits will not freeze, due to heat provided from the heater 63. Nevertheless, water circulation prohibits "hot slug" development. Water in the nipples 30, 40, 50, 51 will not freeze due to the circulation of warm water in adjacent parts of the apparatus. Finally, nipple terminal portions can, if necessary, be discouraged from freezing in an inoperative condition by the described slot configuration.

The invention is claimed as follows:

1. A recirculating animal waterer, comprising, in combination, a water supply conduit adapted to extend from a water source to a first junction, a first nipple extending from the first junction, a cross-over conduit extending from the first junction to a remote second junction, the first and second junctions being mounted at substantially the same hydraulic levels, a second nipple extending from the second junction, a return conduit separated from the supply conduit and extending from the second junction back to the first junction, and a heater mounted adjacent the return conduit whereby to heat water in the return conduit and encourage convective, endless water flow in the waterer without directly heating water in the water supply conduit.

2. A recirculating animal waterer according to claim 1 including a housing member, the first and second nipples each extending from their respective junctions through the housing to terminal points outside the housing so as to provide nipple access to thirsty animals.

3. A recirculating animal waterer according to claim 1 including a thermostat electrically connected to said heater so as to cause said heater to operate on an intermittent basis.

4. An animal waterer according to claim 3 wherein said thermostat is located adjacent said second nipple.

5. A recirculating animal waterer according to claim 1 including water shut-off means located in said supply conduit between said first junction and said remote water source.

6. An animal waterer according to claim 1 wherein said return conduit includes a heatable section having a section inlet located below a section outlet.

7. A recirculating animal waterer according to claim 2 wherein said first and second junctions are mounted on opposite sides of said housing.

8. A recirculating animal waterer according to claim 1 wherein said water supply conduit includes a single line extending from a position below a soil frost line to said first junction, and wherein said first junction is located at a position above said soil frost line.

9. A recirculating animal waterer according to claim 1 or 2 wherein at least one of said nipples includes a hollow cylinder having a downstream end, the downstream cylinder end defining an anti-freeze-up slot extending axially inwardly in an upstream direction from the downstream cylinder nipple mouth end.

10. A recirculating animal waterer according to claim 1 or 2 wherein at least one of said nipples has an upstream end adapted to receive water, and a downstream mouth extending axially toward and terminating at a downstream end, the nipple also including a valve member carried in the body member and having a stem adapted to be canted from a closed, water-flow-halting position to an open, water-flow-permitting position, the nipple body mouth taking the shape of a hollow right cylinder through which a bevel plane has been passed, thereby exposing a limited side portion of the valve member stem to canting motion by animal biting action, but prohibiting the animal from grasping the stem during biting action, the mouth defining an anti-freeze-up slot in the cylinder wall extending axially inwardly in an upstream direction from the downstream nipple mouth end.

11. A recirculating animal waterer, comprising, in combination, a walled housing, a supply conduit extending from a water source into the housing and terminating at a first junction, a first nipple extending from the first junction through the housing wall and terminating outside the housing, a conduit extending from the first junction to a remote second junction, a second nipple extending through the housing wall and terminating outside the housing wall, at least one additional conduit extending from the second conduit to an additional downstream junction point, a return conduit separate from the supply conduit and extending at least indirectly from the additional junction point back to the first junction, and a heater positioned in the housing to heat water in the return conduit so as to cause water to recirculate through the conduits except the supply conduit and past the nipples in a substantially continuous flow.

12. A recirculating animal waterer according to claim 11 including thermostat means electrically connected between a remote source of electrical power and said heater means so as to operate the heater means on an intermittent basis.

13. A recirculating animal waterer according to claim 12 wherein said thermostat is located substantially adjacent said second nipple.

14. A recirculating animal waterer according to claim 12 wherein said first and second nipples are mounted in spaced apart relation on said housing.

15. A recirculating animal waterer according to claim 11 wherein said conduit connecting said first and second junctions is located substantially entirely above said heater.

16. A recirculating animal waterer according to claim 15 wherein said heater is mounted substantially below said first junction and adjacent the return conduit.

17. A recirculating animal waterer according to claim 11 including shield members mounted upon said housing and substantially adjacent the nipple, whereby to encourage thirsty animals to approach said nipple from a facing, head-on position so as to minimize water leakage and mess in and around said recirculating animal waterer.

18. A recirculating animal waterer according to claim 11 including insulation means carried adjacent the housing wall interior, whereby to insulate the animal waterer housing interior from the effects of cold, outside air.

19. A recirculating animal waterer according to claim 11 including shut-off means in said supply conduit, said shut-off means being located between a remote source of water and said first junction.

20. A recirculating animal waterer according to claim 11 wherein said supply conduit includes a single water supply line extending from below a soil frost line to the first junction point located above that soil frost line.

21. A recirculating animal waterer according to claim 11 or 14 wherein at least one nipple has a downstream end, the downstream end defining an anti-freeze-up slot extending axially inwardly in an upstream direction from the downstream nipple mouth end.

22. A recirculatng animal waterer according to claim 11 or 14 wherein at least one of said nipples has an upstream end adapted to receive water, and a downstream mouth extending axially toward and terminating at a downstream end, the nipple also including a valve member carried in the body member and having a stem adapted to be canted from a closed, water-flow-halting position to an open, water-flow-permitting position, the nipple body mouth taking the shape of a hollow right cylinder through which a bevel plane has been passed, thereby exposing a limited side portion of the valve member stem to canting motion by animal biting action, but prohibiting the animal from grasping the stem during biting action, the mouth cylinder defining an anti-freeze-up slot in the cylinder wall extending axially inwardly in an upstream direction from the downstream nipple mouth end.

* * * * *